United States Patent
Allen et al.

(10) Patent No.: US 11,370,258 B2
(45) Date of Patent: Jun. 28, 2022

(54) TRAILING BLADE SUSPENSION SYSTEM WITH ANGLED BLADE

(71) Applicant: Ford Global Technologies, LLC, Dearborn, MI (US)

(72) Inventors: Steve Allen, Saline, MI (US); Brian Chen, Dearborn, MI (US); Shane Edward Foley, Livonia, MI (US); Nicholas Mangus, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/035,076

(22) Filed: Sep. 28, 2020

(65) Prior Publication Data

US 2022/0097468 A1 Mar. 31, 2022

(51) Int. Cl.
*B60G 3/18* (2006.01)
*B62D 7/16* (2006.01)
*B62D 7/18* (2006.01)
*B62D 7/20* (2006.01)

(52) U.S. Cl.
CPC .............. *B60G 3/18* (2013.01); *B62D 7/16* (2013.01); *B62D 7/18* (2013.01); *B62D 7/20* (2013.01)

(58) Field of Classification Search
CPC .. B60G 3/18; B60G 2200/20; B60G 2200/21; B60G 2200/22; B60G 7/01; B60G 7/008; B62D 7/20; B62D 7/16; B62D 7/18
See application file for complete search history.

(56) References Cited

U.S. PATENT DOCUMENTS

| | | | | |
|---|---|---|---|---|
| 4,696,488 A | * | 9/1987 | Mitobe | B60G 7/001 280/124.131 |
| 4,765,650 A | * | 8/1988 | Kameshima | B60G 9/00 280/124.116 |
| 4,832,363 A | * | 5/1989 | Mitobe | B60G 3/202 280/124.128 |
| 5,895,063 A | * | 4/1999 | Hasshi | B60G 7/00 280/124.134 |
| 8,764,039 B2 | * | 7/2014 | Keller | B60G 7/001 280/124.128 |

(Continued)

FOREIGN PATENT DOCUMENTS

AT 9133 U1 * 5/2007 ........... B60G 21/051
CN 105365885 A * 3/2016

(Continued)

OTHER PUBLICATIONS

Machine Translation of DE102014214205 (Year: 2015).*
Machine Translation of DE19708421 (Year: 1998).*

*Primary Examiner* — Paul N Dickson
*Assistant Examiner* — Kurtis Nielson
(74) *Attorney, Agent, or Firm* — Burr & Forman, LLP (57) ABSTRACT

A suspension system for a vehicle may include a steering knuckle operably coupled to a wheel hub, and a plurality of links operably coupling the steering knuckle to a chassis of the vehicle. One of the links may be a trailing blade having a body portion that lies in a plane. The trailing blade may include a first end operably coupled to the steering knuckle and a second end operably coupled to the chassis. The trailing blade may extend from the first end to the second end such that the plane of the body portion forms an angle of greater than 5 degrees relative to a longitudinal axis of the vehicle.

20 Claims, 9 Drawing Sheets

(56) References Cited

U.S. PATENT DOCUMENTS

| | | | |
|---|---|---|---|
| 2005/0140110 A1* | 6/2005 | Lee | B60G 7/008 280/124.109 |
| 2005/0173882 A1* | 8/2005 | Drabon | B60G 21/051 280/124.107 |
| 2008/0277893 A1* | 11/2008 | Murata | B60G 3/145 280/124.128 |
| 2010/0102527 A1* | 4/2010 | Yanagida | B60G 7/02 280/124.135 |
| 2014/0054871 A1* | 2/2014 | Jakob | B62D 5/0418 280/124.134 |
| 2015/0123371 A1* | 5/2015 | Lee | B60G 21/052 280/124.128 |
| 2017/0355240 A1* | 12/2017 | Zandbergen | B60G 7/001 |
| 2019/0047625 A1* | 2/2019 | Kato | B60G 3/18 |
| 2019/0126702 A1* | 5/2019 | Hacker | B60G 7/008 |
| 2019/0367094 A1* | 12/2019 | Seo | B60G 3/202 |

FOREIGN PATENT DOCUMENTS

| | | | | |
|---|---|---|---|---|
| CN | 108583185 A | * | 9/2018 | |
| CN | 111284559 A | * | 6/2020 | |
| DE | 19708421 A1 | * | 9/1998 | B60G 7/02 |
| DE | 10111135 A1 | * | 9/2002 | B60G 7/02 |
| DE | 102014214205 A1 | | 1/2015 | |
| DE | 202019102582 U1 | * | 8/2019 | B60G 3/18 |
| EP | 0242883 A1 | * | 10/1987 | B60G 3/205 |
| JP | 2008195296 A | * | 8/2008 | B60G 3/22 |
| KR | 20050055064 A | * | 6/2005 | |
| KR | 20120050204 A | | 5/2015 | |
| KR | 20150067976 A | | 6/2015 | |
| WO | WO-2007024919 A2 | * | 3/2007 | B60G 3/285 |

* cited by examiner

TRAILING BLADE SUSPENSION SYSTEM WITH ANGLED BLADE

TECHNICAL FIELD

Example embodiments generally relate to vehicle suspension and, more particularly, relate to a suspension system with a trailing blade having a significant angle relative to the longitudinal axis of the vehicle.

BACKGROUND

Vehicles commonly employ independent suspension that allows each wheel to move relative to the vehicle chassis independent of the other wheels. The components and geometries used for independent suspension designs can vary to some degree. However, a typical independent suspension system will employ shock absorbers (or simply "shocks") that are designed to provide damping, and multiple links that connect the vehicle body to a wheel carrier or steering knuckle. The links can also take a number of different forms.

One particular type of suspension that is commonly employed at the rear axle of some vehicles is a trailing blade short-long arm (SLA) suspension. The trailing blade SLA suspension typically includes the knuckle constrained by a rigidly attached longitudinally extending blade (i.e., the trailing blade) and three lateral links that are attached with bushings or ball joints. The trailing blade is an over-constrained architecture in which the blade itself must be sufficiently compliant in the lateral direction to allow the knuckle to rotate about the vehicle longitudinal and vertical axes through vertical wheel travel. If the blade is too laterally stiff, the trailing blade bushing may have excessive displacement with vertical wheel travel, and bump steer will be affected. The blade design must therefore balance lateral compliance with longitudinal strength to react to loads without buckling.

For low cost and weight vehicle designs, trailing blades are constrained to being close to the wheel center in the lateral and longitudinal directions. This reduces longitudinal loads to which the blade must react and reduces the size of the knuckle as the knuckle does not have to stretch forward or inboard significantly to meet the blade. The lateral position of the blade is therefore primarily limited by the lateral position of the bushing, which is limited by body structure, and the tire. The blade position and shape can be limited further by the body rear rail, fuel filler pipe, lateral links, stabilizer bar, etc.

With all of these many potential constraints on the position of the trailing blade, and the fact that the trailing blade typically extends in a plane parallel to the longitudinal axis of the vehicle, the trailing blade can actually place a number of limits on other vehicle design elements. Accordingly, it may be desirable to consider potential improvements to trailing blade design.

BRIEF SUMMARY OF SOME EXAMPLES

In accordance with an example embodiment, a suspension system for a vehicle may be provided. The suspension system may include a steering knuckle operably coupled to a wheel hub, and a plurality of links operably coupling the steering knuckle to a chassis of the vehicle. One of the links may be a trailing blade having a body portion that lies in a plane. The trailing blade may include a first end operably coupled to the steering knuckle and a second end operably coupled to the chassis. The trailing blade may extend from the first end to the second end such that the plane of the body portion forms an angle of greater than 5 degrees relative to a longitudinal axis of the vehicle.

In another example embodiment, a support assembly for a vehicle suspension system may be provided. The assembly may include a lateral support assembly and a trailing blade. The lateral support assembly may include multiple links operably coupled to a steering knuckle to support the steering knuckle laterally with respect to a longitudinal axis of the vehicle. The trailing blade may be operably coupled to the steering knuckle to support the steering knuckle longitudinally. The trailing blade may include a planar body portion having a first end operably coupled to the steering knuckle and a second end operably coupled to a chassis of the vehicle. The trailing blade may be retained between the chassis and the steering knuckle to form an angle of greater than 5 degrees relative to the longitudinal axis of the vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, the typical trailing blade architecture may provide rigid limitations on relationships between track width and body rail width, which may impact the ability to make designs having large lateral offsets between the trailing blade bushing and the wheel center and tires. Thus, some embodiments may provide an improved suspension system that enables increased flexibility with respect to the relationship between vehicle track width and body rail width among other improvements. In this regard, example embodiments provide a planar trailing blade that extends at a significant angle relative to the longitudinal axis of the vehicle to provide the ability to accommodate larger lateral offsets, and free up designers to make wider rear floors, third row seats, or other improvements while still accommodating other vehicle components without significant cost and weight increases.

Figure 1:
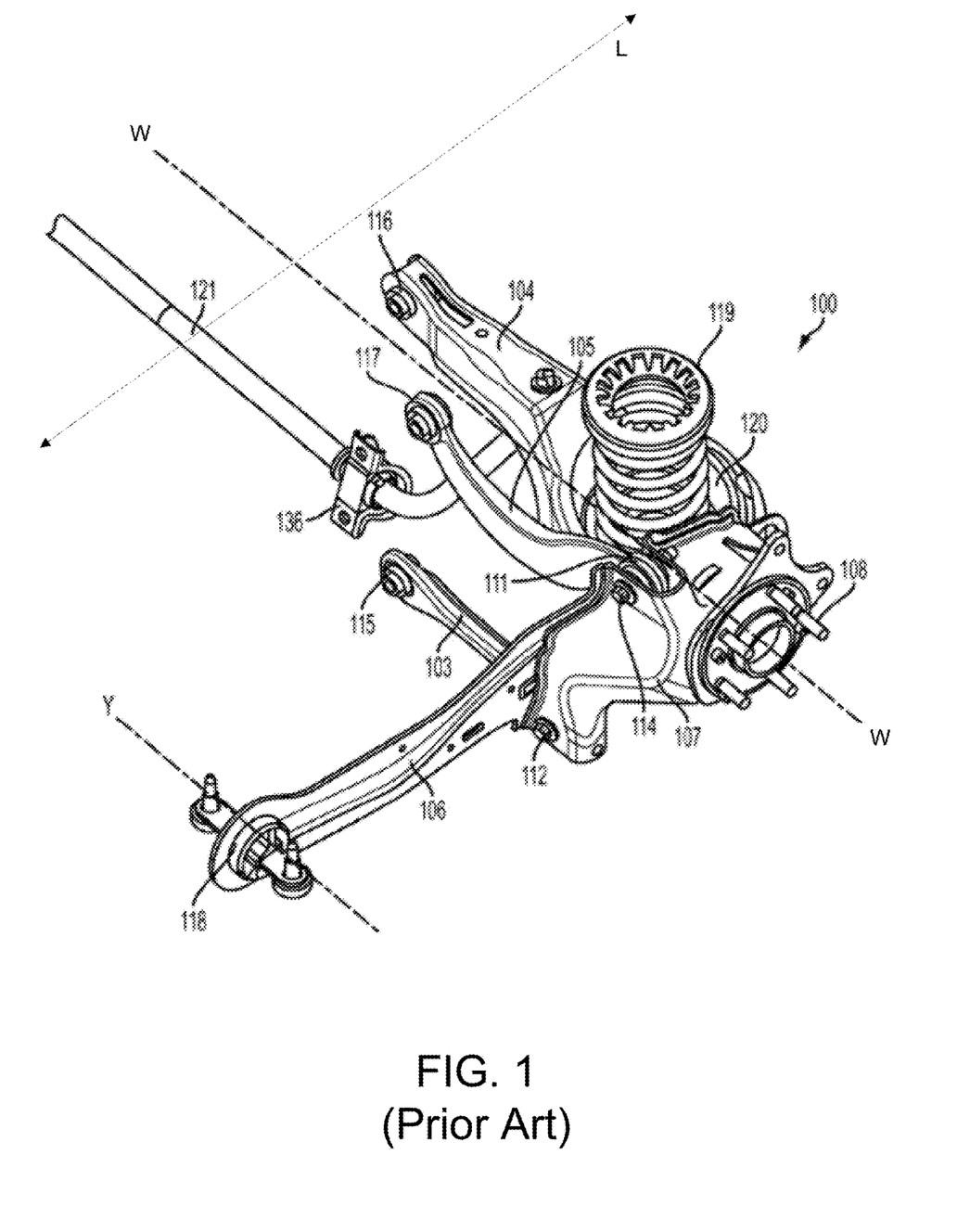
FIG. 1 illustrates a perspective view of a conventional vehicle rear suspension having multiple supporting links.
Figure 2:
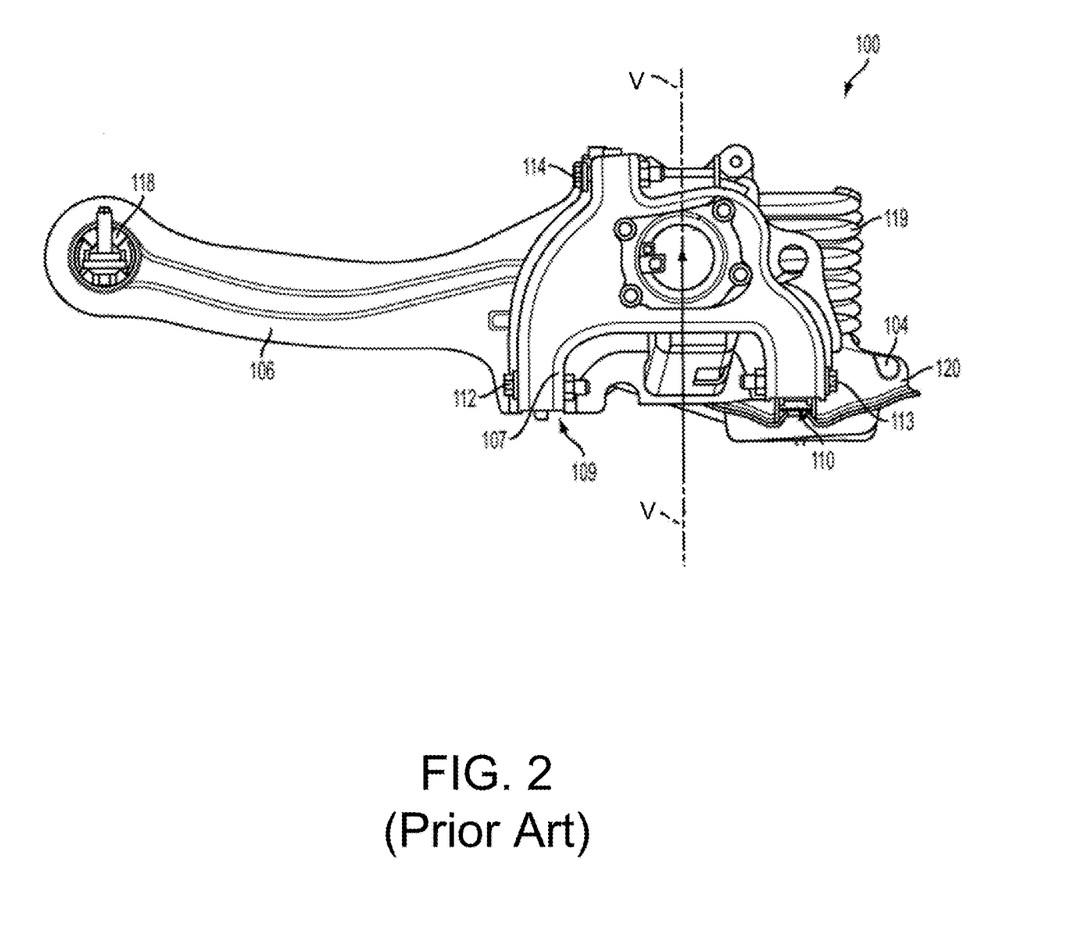
FIG. 2 illustrates a side view of the vehicle rear suspension shown in FIG. 2.

FIGS. 1 and 2 show perspective and side views, respectively, of a wheel suspension 100 of a multilink rear axle for a vehicle. As noted above, this configuration is known as a trailing arm axle. Although only a single wheel suspension 100 is illustrated in FIGS. 1 and 2, normally a second wheel suspension would be arranged on the opposite side of the vehicle. The wheel suspensions on opposite sides of the vehicle (e.g., in a width direction of the vehicle) may be mirror images of each other.

Each wheel suspension 100 includes two lower control arms 103 and 104, an upper control arm 105, and a trailing arm 106. The control arms 103, 104, and 105 are coupled to a wheel carrier or knuckle 107 and are capable of pivoting (e.g., rotating in a plane transverse to a longitudinal direction of the vehicle) about pivot points 112, 113 and 114 via respective bushings 109, 110, and 111. A wheel (not shown) can be attached to the wheel carrier 107 via bolts 108.

The three control arms 103, 104, and 105 extend generally inwardly and, in some cases, may be approximately parallel to the width direction of the vehicle, i.e., the vehicle horizontal, and to wheel axis (W). In some cases, there may also be small angular differences between the angles the three control arms 103, 104 and 105 form relative to each other and the wheel axis (W). Moreover, in some cases, the vehicle horizontal axis and the wheel axis (W) may have small angular differences therebetween. At respective ends opposite to the pivot points 112, 113, and 114, the control arms 103, 104, and 105 can be coupled to the vehicle body via respective bushings 115, 116, and 117 that allow the control arms to pivot (e.g., rotate in a plane transverse to the longitudinal direction of the vehicle).

A longitudinal suspension arm, or trailing arm, 106 is an elongated plate extending away from the wheel carrier 107, for example, along the longitudinal direction toward a front of the vehicle. The trailing arm 106 thus has low torsional resistance and allows for flexing or bending about the vertical axis (V). The trailing arm 106 is coupled at one end to the vehicle body via a bushing 118 and at an opposite end to the wheel carrier 107. The bushing 118 allows trailing arm 106 to pivot (e.g., rotate about the illustrated Y-axis). The trailing arm 106 acts to absorb forces in the vehicle longitudinal direction as well as control the trajectory of the rear wheel during compression and extension of spring element 119.

A damper (not shown) and spring element 119, e.g., a coil spring, are provided to support the vehicle body or frame on the wheel suspension 100. A spring plate 120, which is formed as part of the rear lower control arm 104, holds the spring element 119. For stabilization, an anti-roll bar 121 is used to provide a rigid connection between the wheel suspensions on opposite sides of the vehicle. The anti-roll bar 121 extends parallel to the vehicle horizontal and wheel axis (W) and is attached at its ends to the lower rear control arms 104 via a respective pendulum arm. The anti-roll bar 21 can be attached via symmetrically arranged brackets 136 to the vehicle body or a frame connected to the vehicle body. For example, brackets 136 (of which only the left bracket is shown in FIG. 1) can take the form of a clip adapted to the cross-section of the anti-roll bar 121.

In the multilink axle illustrated in FIGS. 1 and 2, the use of the trailing arm 106 lies in a plane that extends parallel to a longitudinal axis (L) of the vehicle. This structure leads to the disadvantages noted above. To address these deficiencies, example embodiments provide a trailing blade design that has a plan view angle of greater than 5 degrees. FIGS. 3-6 illustrate a number of views of such improved design.

Figures 4A, 4B:
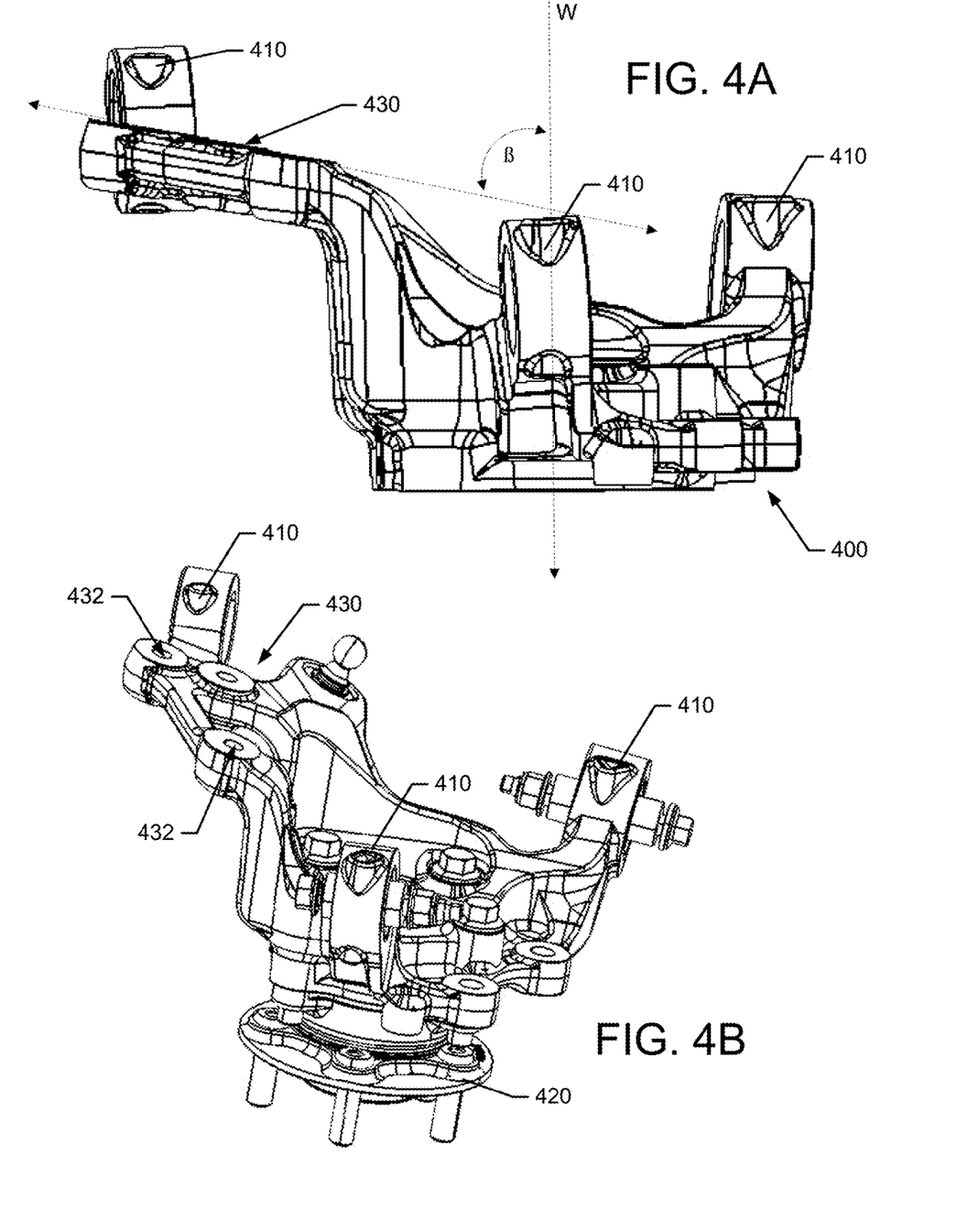
FIG. 4A illustrates a top view of a steering knuckle in accordance with an example embodiment.
FIG. 4B illustrates a perspective view of the steering knuckle in accordance with an example embodiment.
Figure 5A:
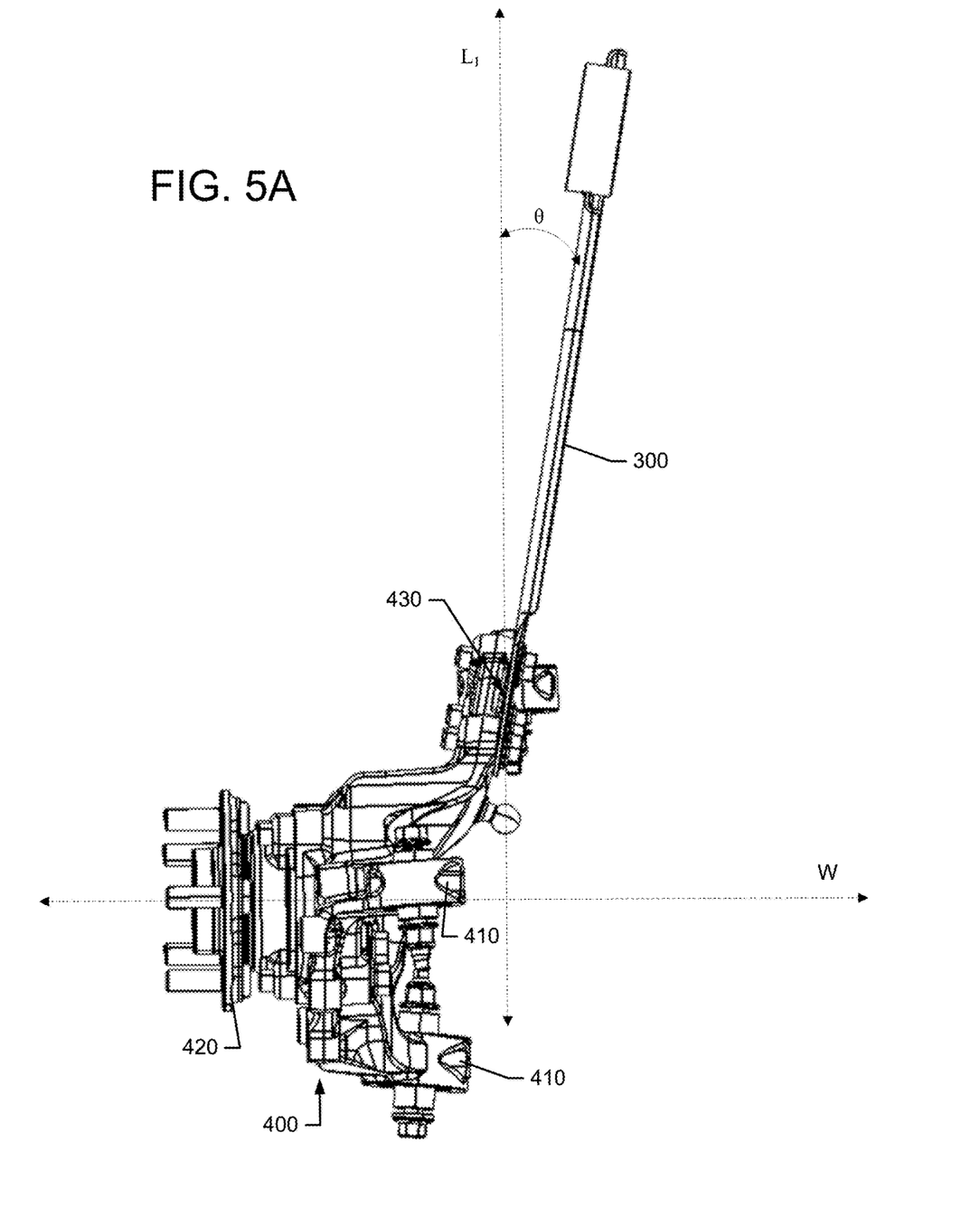
FIG. 5A illustrates a top view of the steering knuckle and trailing blade operable coupled to each other in accordance with an example embodiment.
Figure 5B:
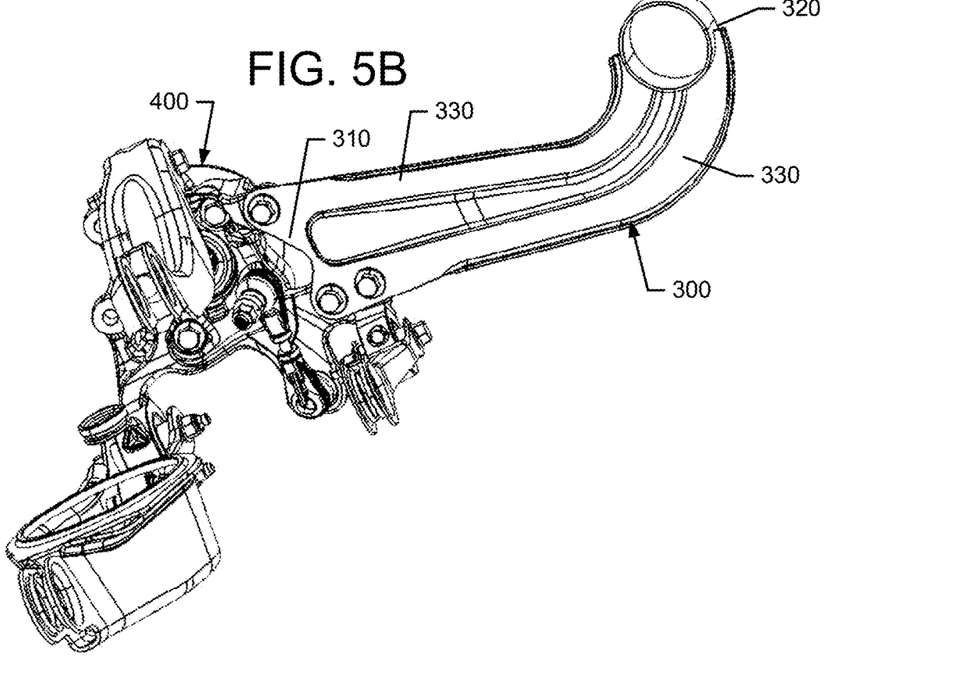
FIG. 5B illustrates a perspective view of the steering knuckle and trailing blade from the interior of the vehicle looking outward in accordance with an example embodiment.
Figure 5C:
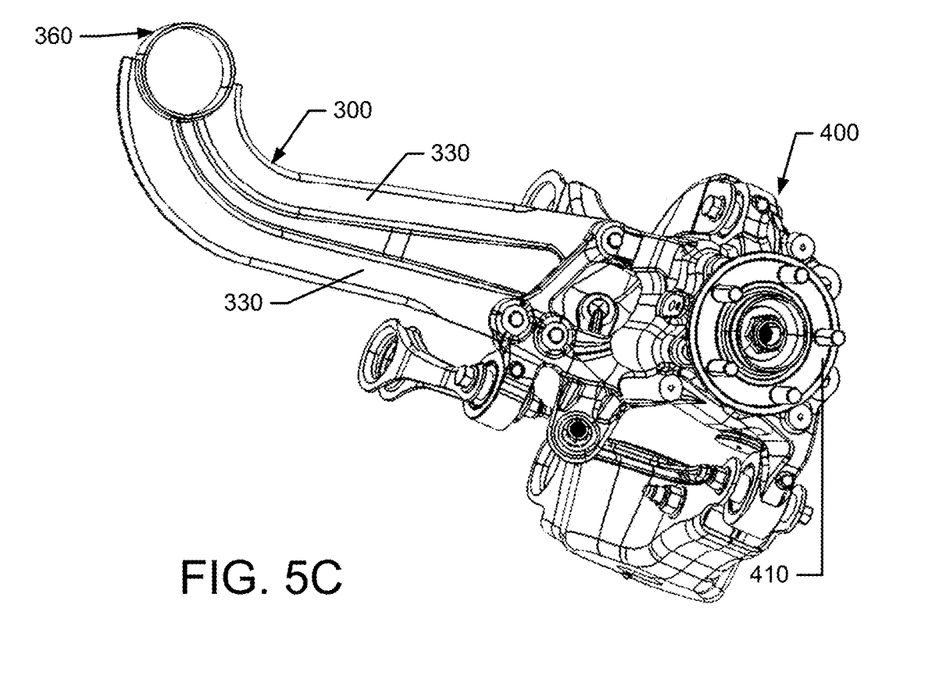
FIG. 5C illustrates a perspective view of the steering knuckle and trailing blade from the exterior of the vehicle looking inward in accordance with an example embodiment.
Figure 6A:
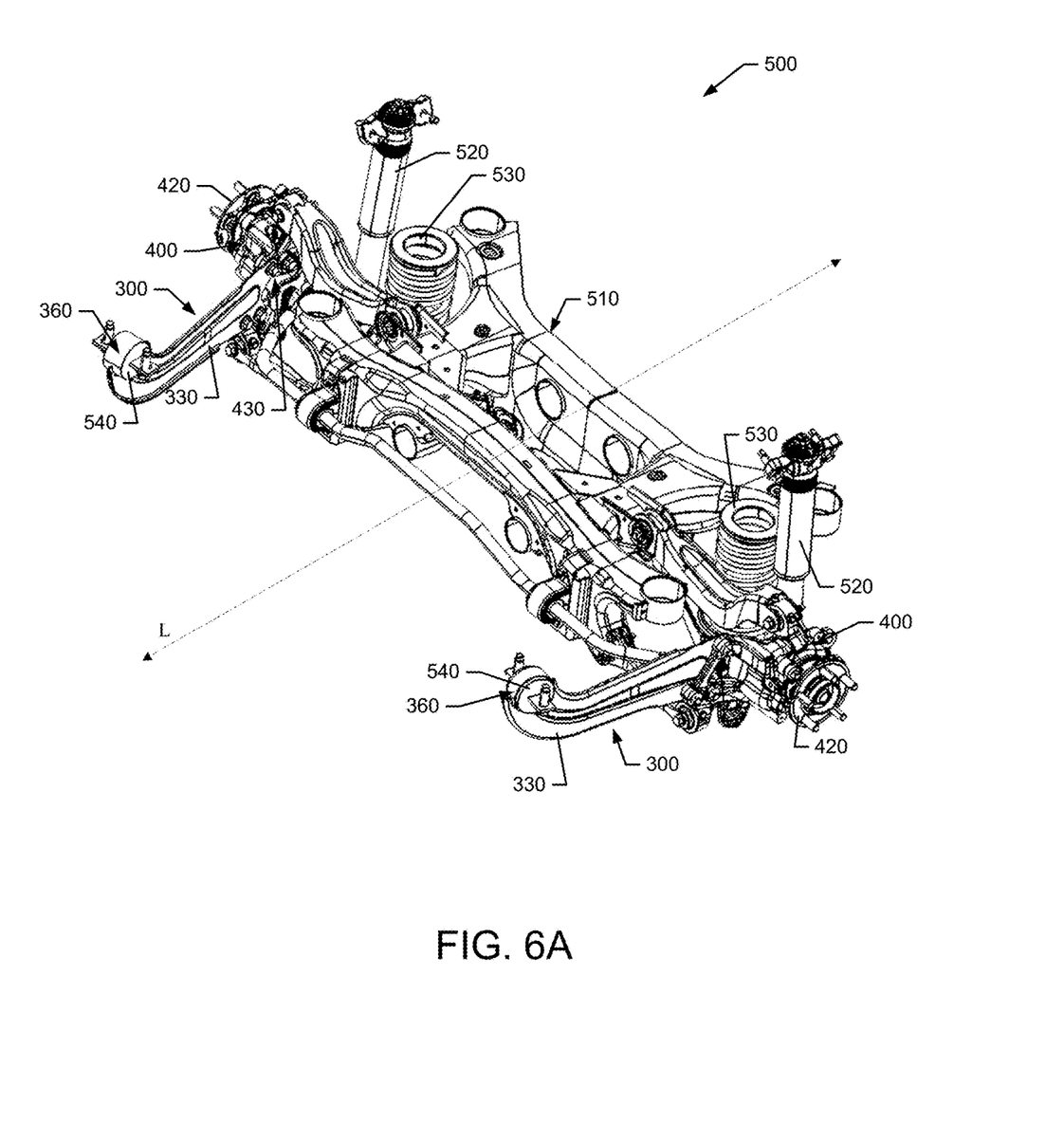
FIG. 6A illustrates a perspective view of a rear suspension system in accordance with an example embodiment.
Figure 6B:
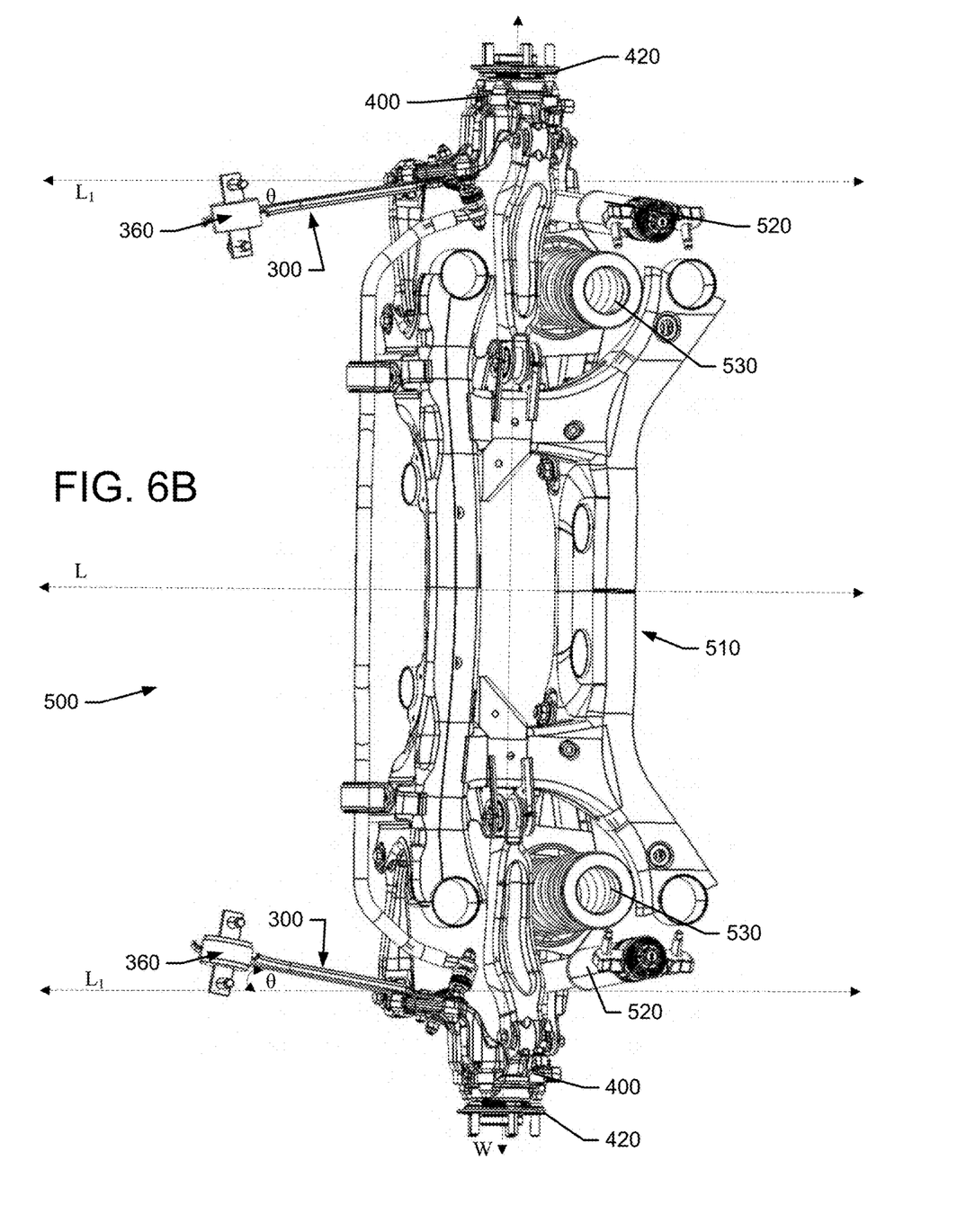
FIG. 6B illustrates a top view of a vehicle suspension system in accordance with an example embodiment.

In this regard, FIG. 3, which is defined by FIGS. 3A, 3B, 3C, 3D and 3E, illustrates various views of a trailing blade of an example embodiment. FIG. 4, which is defined by FIGS. 4A and 4B, illustrates a top and perspective view, respectively, of a steering knuckle in accordance with an example embodiment. FIG. 5, which is defined by FIGS. 5A, 5B and 5C, illustrates various views of the trailing blade and steering knuckle attached to each other. FIG. 6, which is defined by FIGS. 6A and 6B, illustrates a perspective view and a top view, respectively, of the steering knuckle and trailing blade in situ to illustrate their relative positions in a rear suspension system of a vehicle in accordance with an example embodiment.

Referring first to FIG. 3, the trailing blade 300 includes a first end 310 that is configured to be operably coupled to the steering knuckle of a vehicle, and a second end 320 that is configured to be operably coupled to a chassis of the vehicle (e.g., via a bushing). In some examples, the trailing blade 300 may be defined by a base portion 330 that is substantially flat and extends from the first end 310 to the second end 320. The base portion 330 may extend from the first end 310 substantially in a straight line, but may curve proximate to the second end 320. This curvature may provide longitudinal strength to the trailing blade 300. To facilitate both lateral and longitudinal strength, the trailing blade 300 may also include reinforcement features 340 that are incorporated into or extend from edges of the base portion 330. In the example of FIG. 3, the reinforcement features 340 may include edge portions that extend along outside edges of all or part of the base portion 330. The edge portions may extend in a direction substantially perpendicular to the base portion 330. The reinforcement features 340 may also include a central spine or ridge structure that extends out of the base portion 330 over a central portion of the base portion 330.

Figure 3A:
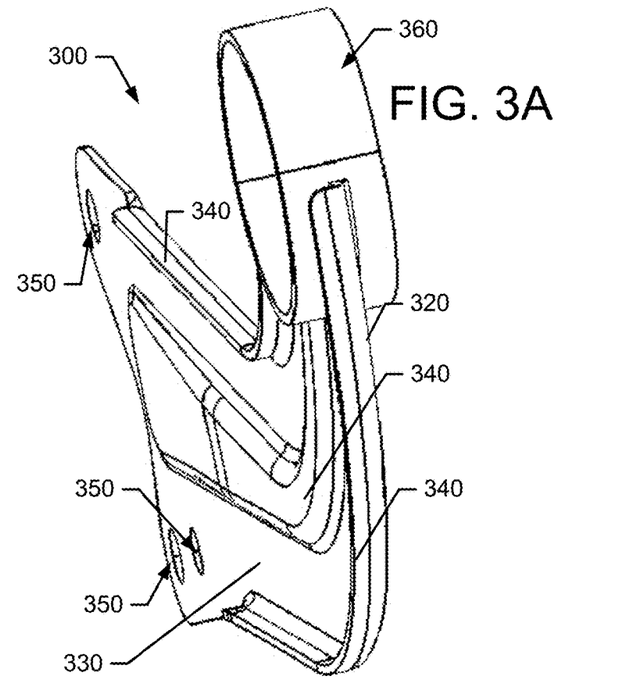
FIG. 3A illustrates perspective view of a second end of a trailing blade in accordance with an example embodiment.
Figure 3B:
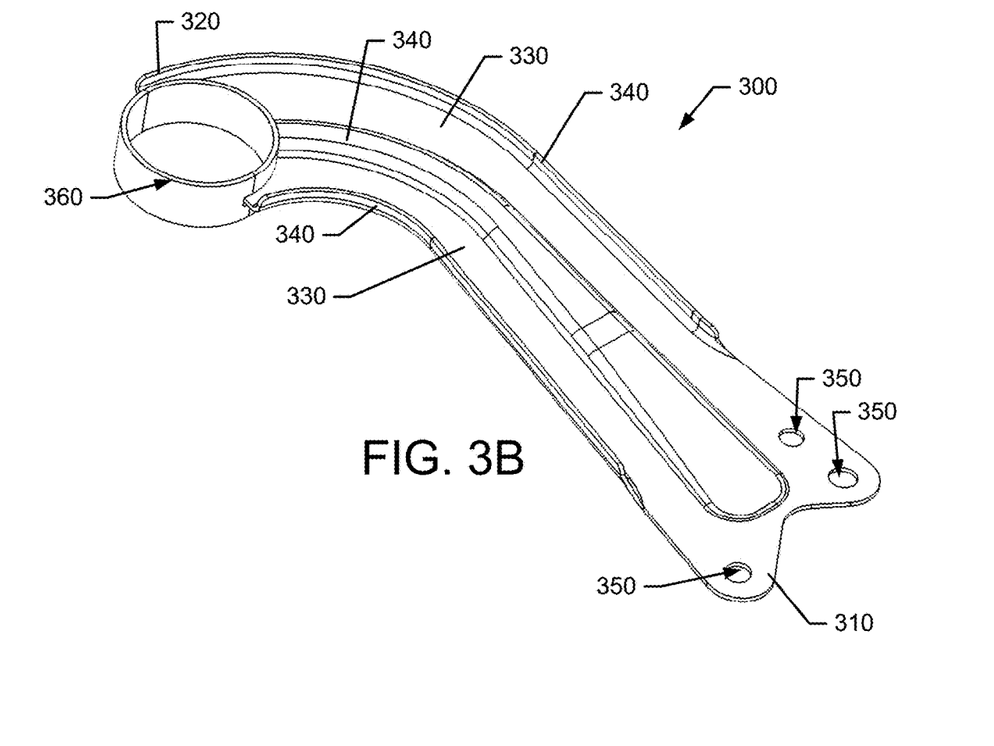
FIG. 3B illustrates a perspective view of a first end of the trailing blade of FIG. 3A in accordance with an example embodiment.
Figure 3C:
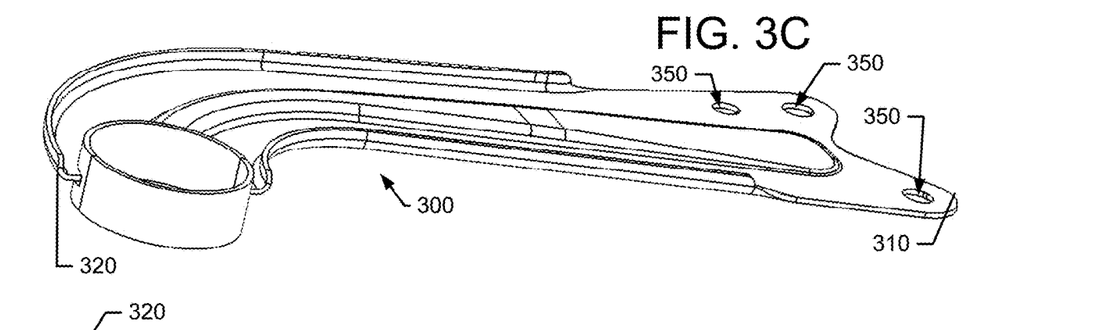
FIG. 3C illustrates a perspective view of the trailing blade from a side perspective in accordance with an example embodiment.
Figure 3D:
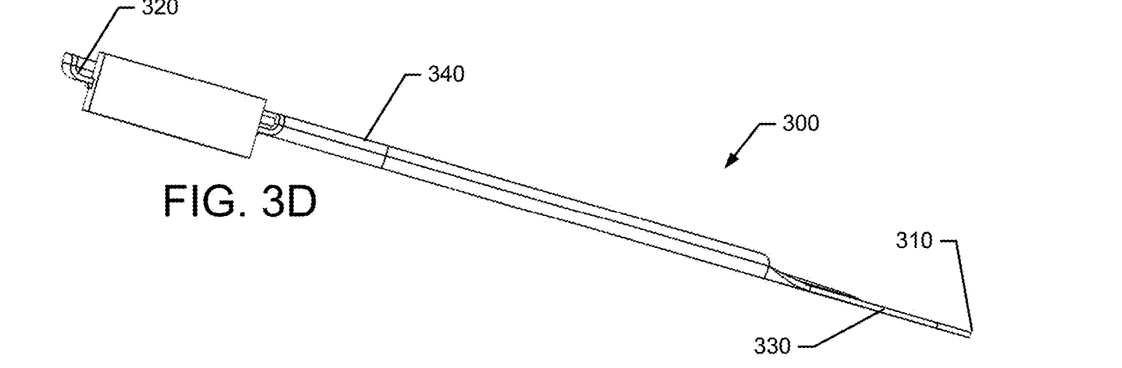
FIG. 3D illustrates a top view of the trailing blade in accordance with an example embodiment.
Figure 3E:
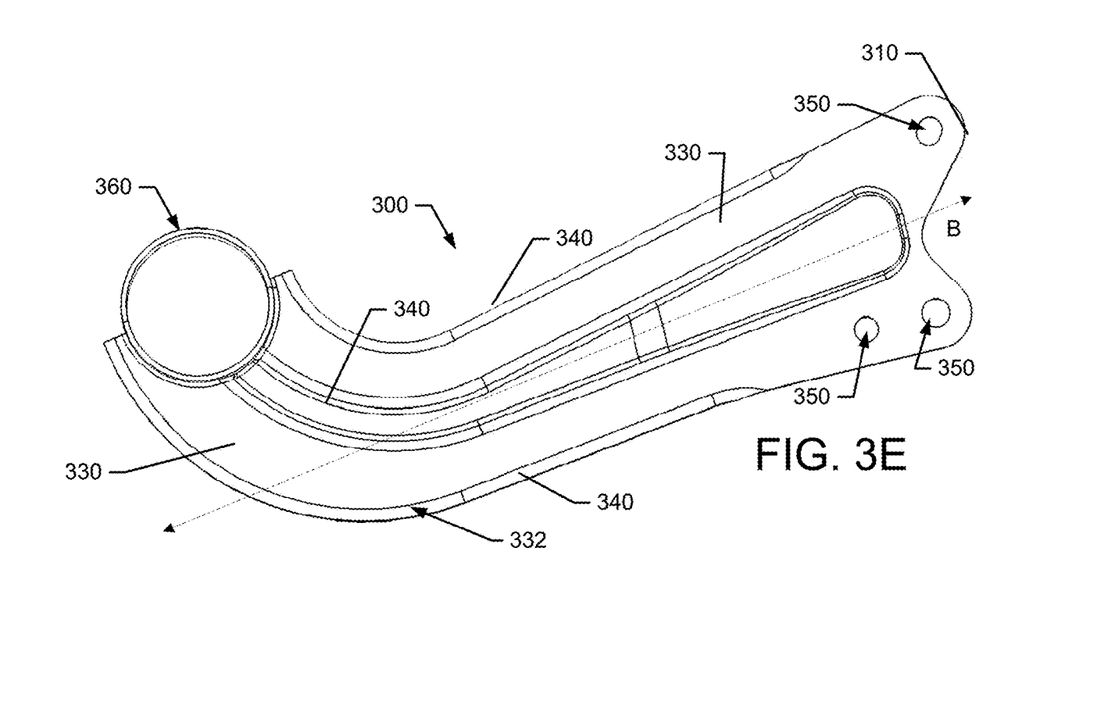
FIG. 3E illustrates a side view of the trailing blade in accordance with an example embodiment.

FIGS. 3A, 3B and 3C each show different perspective views of the trailing blade 300. Meanwhile, FIG. 3D illustrates a top view of the trailing blade 300 at a vantage point that is above the trailing blade 300, but in a same plane as the trailing blade. FIG. 3E illustrates a side view of the trailing blade 300 from a vantage point displaced from the plane by a distance along a line substantially perpendicular to the plane. As can be appreciated from FIG. 3, the trailing blade 300 is a planar component with the plane being defined by (or passing through) the base portion 330. Portions of the trailing blade 300 that extend out of the plane (e.g., the reinforcement features 340) generally extend away from the plane of the base portion 330, and nevertheless lie between two planes parallel to the plane of the base portion 330.

The trailing blade 300 may include a plurality of (in this example three) fixing orifices 350 disposed in the base portion 330 proximate to the first end 310. The trailing blade 300 may also include a bushing holder 360 disposed at the second end 320 and configured to retain a bushing for fixing the trailing blade 300 to the chassis of the vehicle to which the trailing blade 300 is attached. A curved portion 332 (i.e., a portion having the curved shape mentioned above) of the base portion 330 may be provided proximate to the bushing holder 360, and the curved shape may also be evident in the reinforcement features 340. In some cases, the base portion 330 may be wider at the first end 310 and taper slightly as the curved portion 332 of the base portion 330 is approached. The width of the base portion 330 may be substantially constant at the curved portion 332 of the base portion 330. As such, the curved portion 332 of the base portion 330 may be proximate to the bushing holder 360, and may laterally displace the bushing holder 360 to be offset from a line (B) bisecting the first end 310 of the base portion 330.

As noted above, the trailing blade 300 is attached to a steering knuckle 400, which is shown in FIGS. 4A-4C. In this regard, the steering knuckle 400 may include a plurality of link attachment points 410 that enable the links of a lateral support assembly to be operably coupled to the steering knuckle 400. The lateral support assembly may include control arms or links (e.g., control arms 103, 104, and 105 of FIGS. 1 and 2) that combine with the trailing blade 300 to form a support assembly for the suspension system.

The steering knuckle 400 also rotatably supports the spindle or hub 420 to which the wheel of the vehicle is attached. The steering knuckle 400 is operably coupled to the trailing blade 300 at a trailing blade interface that is defined by a trailing blade mounting surface 430. The trailing blade mounting surface 430 extends parallel to the plane of the trailing blade 300 and is affixed to the body portion 330 of the trailing blade 300 via screws or bolts that attach to receivers 432 formed in the trailing blade mounting surface 430. The screws or bolts also pass through the fixing orifices 350 of the trailing blade 300 before being retained in the receivers 432. Notably, the trailing blade mounting surface 430 of FIGS. 4A-4C is discontinuous (i.e., comprising three distinct surfaces proximate to each of the receivers 432), but it should be appreciated that the trailing blade mounting surface 430 could alternatively be formed as a continuous surface. Furthermore, other methods of operably coupling the trailing blade 300 to the steering knuckle 400 may also be used. For example, the trailing blade 300 and steering knuckle 400 may be joined together as separate parts of a multi-piece weldment.

As can be appreciated from FIG. 4, and seen explicitly in FIG. 5, a wheel axis (W) of the hub 420 forms an angle (B) relative to the trailing blade mounting surface 430 and, when installed) the plane of the trailing blade 300 (i.e., the plane of the body portion 330 of the trailing blade 300). This angle is conventionally about 90 degrees. However, in example embodiments, the angle is less than 85 degrees and in some cases about 80 degrees. Accordingly, the angle between the plane of the body portion 330 of the trailing blade 300 and the longitudinal centerline of the vehicle is about 10 degrees (or at least greater than 5 degrees). A line ($L_1$) parallel to the longitudinal axis (L) of the vehicle is shown in FIG. 5A for comparison purposes.

In a typical situation, as noted above, a planar trailing blade forms nearly a 90 degree angle to the wheel axis (W), and forms less than a 5 degree angle relative to the longitudinal centerline of the vehicle. In situations where a non-planar trailing blade is used, the curvature of the non-planar trailing blade will need external supporting structures that increase cost, weight and complexity. Accordingly, the ability to provide a lateral offset of the steering knuckle 400 relative to the chassis portion to which the trailing blade attached via a trailing blade that is planar and yet forms an angle of greater than 5 degrees relative to the longitudinal centerline of the vehicle can drastically increase design options and flexibility without correspondingly increasing costs and weight.

FIGS. 6A and 6B show two instances of the trailing blade 300 of an example embodiment within a rear suspension system 500. The rear suspension system 500 may include a sub-frame assembly 510, shocks (or dampers) 520, springs 530 and various other components for mounting the rear suspension system 500 to a chassis of the vehicle. Various links may be included to operably couple the steering knuckle 400 to the sub-frame assembly 510 and/or the chassis. As noted above, the trailing blade 300 may extend from the steering knuckle 400 to a bushing 540 that can be operably coupled to the chassis or body of the vehicle. The trailing blade 300 is attached to the trailing blade mounting surface 430, which is formed at an angle relative to the wheel axis (W) so as to ensure that the trailing blade 300 also forms an angle (θ) of greater than 5 degrees (e.g., about 10 degrees in the example shown) with respect to the line ($L_1$), which is parallel to the longitudinal axis (L) of the vehicle.

Example embodiments may provide improved flexibility for designer by maintaining the original bushing position on the chassis, but moving the trailing blade to knuckle attachment farther outboard relative to the vehicle's longitudinal centerline. With more lateral clearance to the body, fuel filler pipe, stabilizer bar or other components, the trailing blade can also extend rearward closer to the wheel center and have less of a side view bend. Because the trailing blade is still planar, the trailing blade remains strong enough to react to longitudinal loads while also being compliant enough to deflect laterally. These advantages result in a lighter trailing blade and a smaller, lighter steering knuckle compared to conventional designs. This effectively provides improved vehicle architecture flexibility for different track widths and common body rail widths due to the highly angled (e.g., greater than 5 degrees) trailing blade. Example embodiments also enable the trailing blade mass to remain low and have reduced mass relative to conventional designs by about 0.5 kg. Steering knuckle mass may also be reduced significantly (e.g., by as much as 2 kg) for a total mass reduction of 5 kg per vehicle compared to trailing blades that have no angle (or less than 5 degrees). Notably, the 5 kg per vehicle weight reduction comes with only a 5% load increase in the longitudinal forward case. Lateral and longitudinal compliance steers change insignificantly, and the trailing blade bushing axial and conical displacements decrease slightly, which is an improvement for bushing durability.

A suspension system (e.g., a rear suspension system) for a vehicle may therefore be provided. The suspension system may include a steering knuckle operably coupled to a wheel hub, and a plurality of links operably coupling the steering knuckle to a chassis of the vehicle. One of the links may be a trailing blade having a body portion that lies in a plane. Notably, the operable coupling of the trailing blade to the steering knuckle may be by virtue of the trailing blade being bolted to the steering knuckle (or attached via some other suitable means). However, in some cases, instead of bolting or otherwise attaching separate components, the operable coupling may be accomplished by virtue of forming the trailing blade and steering knuckle as parts of a multi-piece weldment. The trailing blade may include a first end operably coupled to the steering knuckle and a second end operably coupled to the chassis. The trailing blade may extend from the first end to the second end such that the plane of the body portion forms an angle of greater than 5 degrees relative to a longitudinal axis of the vehicle.

The suspension system (or support assembly of such system) of some embodiments may include additional features, modifications, augmentations and/or the like to achieve further objectives or enhance performance of the system/assembly. The additional features, modifications, augmentations and/or the like may be added in any combination with each other. Below is a list of various additional features, modifications, and augmentations that can each be added individually or in any combination with each other. For example, the trailing blade may extend from the first end to the second end at an angle of greater than 10 degrees relative to the longitudinal axis of the vehicle. In an example embodiment, the steering knuckle may include a plurality of link attachment points corresponding to respective links of a lateral support assembly among the plurality of links. The steering knuckle may include a trailing blade interface configured to mate with the first end of the trailing blade. In some cases, the trailing blade interface may include a trailing blade mounting surface formed at an angle of less than 85 degrees relative to a wheel axis defined by rotation of the wheel hub. In an example embodiment, the angle formed between the trailing blade mounting surface and the wheel hub may be less than 80 degrees. In some cases, the trailing blade may include a bushing holder at the second end. The trailing blade may extend substantially linearly away from the first end to a curved portion disposed proximate to the bushing holder. In an example embodiment, the curved portion may laterally displace the bushing holder to be offset from a line bisecting the first end of the base portion. In some cases, the trailing blade may include reinforcement features formed in the base portion, and the reinforcement features may extend away from (or out of) the plane of the base portion. In an example embodiment, the reinforcement features may include edge portions that extend along outside edges of all or part of the base portion and/or a central spine extending over a central portion of the base portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A suspension system for a vehicle, the system comprising:
    a steering knuckle operably coupled to a wheel hub; and
    a plurality of links operably coupling the steering knuckle to a chassis of the vehicle,
    wherein one of the links is a trailing blade having a body portion that lies in a plane,
    wherein the trailing blade comprises a first end operably coupled to the steering knuckle and a second end operably coupled to the chassis; the first end, the body portion, and the second end being coplanar and laying within the plane, and
    wherein a trailing blade interface of the steering knuckle that mates with the first end of the trailing blade is disposed at an angle of greater than 5 degrees relative to a longitudinal axis of the vehicle to cause the trailing blade to extends away from the steering knuckle towards the longitudinal axis of the vehicle at an angle of greater than 5 degrees relative to a longitudinal axis of the vehicle.

2. The suspension system of claim 1, wherein the trailing blade extends away from the steering knuckle towards a longitudinal axis of the vehicle at an angle of greater than 10 degrees relative to the longitudinal axis of the vehicle.

3. The suspension system of claim 1, wherein the steering knuckle comprises a plurality of link attachment points corresponding to respective links of a lateral support assembly among the plurality of links.

4. The suspension system of claim 3, wherein the trailing blade interface comprises a trailing blade mounting surface formed at an angle of less than 85 degrees relative to a wheel axis defined by rotation of the wheel hub.

5. The suspension system of claim 4, wherein the angle formed between the trailing blade mounting surface and the wheel axis is less than 80 degrees.

6. The suspension system of claim 1, wherein the trailing blade comprises a bushing holder at the second end, and
    wherein the trailing blade extends within the plane substantially linearly away from the first end to a curved portion disposed proximate to the bushing holder.

7. The suspension system of claim 6, wherein the curved portion laterally displaces the bushing holder to be offset from a line bisecting the first end of the body portion.

8. The suspension system of claim 1, wherein the trailing blade comprises reinforcement features formed in the body portion, and
    wherein the reinforcement features extend away from the plane of the body portion.

9. The suspension system of claim 8, wherein the reinforcement features comprise edge portions that extend along outside edges of all or part of the body portion.

10. The suspension system of claim 8, wherein the reinforcement features comprise a central spine extending over a central portion of the body portion.

11. The suspension system of claim 1, wherein the trailing blade is rigidly affixed to the steering knuckle and is pivotally affixed to the chassis of the vehicle;
wherein the trailing blade is pivotally affixed to the chassis at a position closer to a center of the vehicle than the steering knuckle;
wherein, relative to the longitudinal axis of the vehicle, a trailing blade is rigidly affixed to the steering knuckle at a position that is farther outboard than a position that the trailing blade is pivotally affixed to the chassis.

12. A support assembly for a vehicle suspension system, the assembly comprising:
a lateral support assembly comprising multiple links operably coupled to a steering knuckle to support the steering knuckle laterally with respect to a longitudinal axis of the vehicle; and
a trailing blade operably coupled to the steering knuckle to support the steering knuckle longitudinally,
wherein the trailing blade comprises a planar body portion having a first end operably coupled to the steering knuckle and a second end operably coupled to a chassis of the vehicle; the first end, the body portion, and the second end being disposed within a plane of the trailing blade,
wherein the trailing blade is retained between the chassis and the steering knuckle,
wherein a trailing blade interface of the steering knuckle that mates with the first end of the trailing blade is disposed at an angle of greater than 5 degrees relative to a longitudinal axis of the vehicle to cause the trailing blade to extend away from the steering knuckle towards the longitudinal axis of the vehicle at an angle of greater than 5 degrees relative to the longitudinal axis of the vehicle.

13. The assembly of claim 12, wherein the trailing blade extends away from the steering knuckle towards the longitudinal axis of the vehicle at an angle of greater than 10 degrees relative to the longitudinal axis of the vehicle.

14. The assembly of claim 12, wherein the steering knuckle comprises a plurality of link attachment points corresponding to each respective links of the lateral support assembly.

15. The assembly of claim 12, wherein the trailing blade interface comprises a trailing blade mounting surface formed at an angle of less than 85 degrees relative to a wheel axis defined by rotation of a wheel hub operably coupled to the steering knuckle.

16. The assembly of claim 15, wherein the angle formed between the trailing blade mounting surface and the wheel axis is less than 80 degrees.

17. The assembly of claim 12, wherein the trailing blade comprises a bushing holder at the second end, and
wherein the trailing blade extends within the plane substantially linearly away from the first end to a curved portion disposed proximate to the bushing holder.

18. The assembly of claim 17, wherein the curved portion laterally displaces the bushing holder to be offset from a line bisecting the first end of the body portion.

19. The assembly of claim 12, wherein the trailing blade comprises reinforcement features formed in the base portion, and
wherein the reinforcement features extend away from the plane of the body portion.

20. The assembly of claim 19, wherein the reinforcement features comprise edge portions that extend along outside edges of all or part of the body portion.

* * * * *

UNITED STATES PATENT AND TRADEMARK OFFICE
CERTIFICATE OF CORRECTION

PATENT NO. : 11,370,258 B2
APPLICATION NO. : 17/035076
DATED : June 28, 2022
INVENTOR(S) : Allen et al.

Page 1 of 1

It is certified that error appears in the above-identified patent and that said Letters Patent is hereby corrected as shown below:

In the Claims

In Column 8, Claim 1, Line 34, "to extends away" should read --to extend away--

In Column 8, Claim 1, Line 35, "a longitudinal axis" should read --the longitudinal axis--

In Column 8, Claim 2, Lines 39-40, "a longitudinal axis" should read --the longitudinal axis--

In Column 10, Claim 14, Line 10, "each respective links" should read --each respective link--

Signed and Sealed this
Eleventh Day of October, 2022

Katherine Kelly Vidal
*Director of the United States Patent and Trademark Office*